(12) United States Patent
    Davis et al.

(10) Patent No.: US 11,734,091 B2
(45) Date of Patent: *Aug. 22, 2023

(54) ENSURING THREAD AFFINITY FOR INTERPROCESS COMMUNICATION IN A MANAGED CODE ENVIRONMENT

(71) Applicant: Microsoft Technology Licensing, LLC, Redmond, WA (US)

(72) Inventors: Jackson M. Davis, Bothell, WA (US); John A. Shepard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/108,414

(22) Filed: Dec. 1, 2020

(65) Prior Publication Data

US 2021/0081264 A1    Mar. 18, 2021

Related U.S. Application Data

(63) Continuation of application No. 16/124,654, filed on Sep. 7, 2018, now Pat. No. 10,872,006, which is a continuation of application No. 15/136,554, filed on Apr. 22, 2016, now Pat. No. 10,102,048, which is a continuation of application No. 12/719,342, filed on Mar. 8, 2010, now Pat. No. 9,323,592, which is a continuation of application No. 11/388,809, filed on Mar. 23, 2006, now Pat. No. 7,676,811.

(51) Int. Cl.
    *G06F 9/44*    (2018.01)
    *G06F 9/54*    (2006.01)
    *H04L 67/01*   (2022.01)
    *H04L 67/1001* (2022.01)

(52) U.S. Cl.
    CPC .............. *G06F 9/547* (2013.01); *G06F 9/546* (2013.01); *H04L 67/01* (2022.05); *H04L 67/1001* (2022.05)

(58) Field of Classification Search
    CPC ...................................................... G06F 9/547
    USPC ........................................................ 719/315
    See application file for complete search history.

(56) References Cited

U.S. PATENT DOCUMENTS

2003/0097395 A1* 5/2003 Petersen ............... G06F 9/5027
                                                        718/102
2005/0144171 A1* 6/2005 Robinson ................ G06F 9/466
                                                        707/999.009

* cited by examiner

*Primary Examiner* — Timothy A Mudrick

(57) ABSTRACT

A remote procedure call channel for interprocess communication in a managed code environment ensures thread-affinity on both sides of an interprocess communication. Using the channel, calls from a first process to a second process are guaranteed to run on a same thread in a target process. Furthermore, calls from the second process back to the first process will also always execute on the same thread. An interprocess communication manager that allows thread affinity and reentrancy is able to correctly keep track of the logical thread of execution so calls are not blocked in unmanaged hosts. Furthermore, both unmanaged and managed hosts are able to make use of transparent remote call functionality provided by an interprocess communication manager for the managed code environment.

20 Claims, 2 Drawing Sheets

ENSURING THREAD AFFINITY FOR INTERPROCESS COMMUNICATION IN A MANAGED CODE ENVIRONMENT

CROSS-REFERENCE TO RELATED APPLICATIONS

This application is a continuation application and claims priority to U.S. patent application Ser. No. 16/124,654, filed Sep. 7, 2018, entitled, "Ensuring Thread Affinity for Interprocess Communication in a Managed Code Environment," which is a continuation of U.S. patent application Ser. No. 15/136,554, filed Apr. 22, 2016, now issued U.S. Pat. No. 10,102,048, which is a continuation of U.S. patent application Ser. No. 12/719,342, filed Mar. 8, 2010, now issued U.S. Pat. No. 9,323,592, which is a continuation of U.S. patent application Ser. No. 11/388,809, filed Mar. 23, 2006, now issued U.S. Pat. No. 7,676,811, which applications are incorporated herein by reference in their entireties.

BACKGROUND

It is commonplace to extend the functionality of an existing application such as MICROSOFT EXCEL by developing an "add-in". An add-in is typically not written by the creators of the host application but by third party developers that want to extend the functionality of the host application. An add-in can be created with development tools such as VISUAL STUDIO .NET 2005® and VISUAL STUDIO 2005 TOOLS FOR APPLICATIONS®. An add-in is a component that a host application such as MICROSOFT EXCEL® loads when it is needed such as when the host application starts up or when a particular document is loaded by the host application.

A host application may choose to execute an add-in in a separate process for several reasons including process stability, platform version resilience, or special debugging scenarios. Running an add-in in a separate process requires a mechanism for the host application and the add-in to communicate across process boundaries. There exist several Remote Procedure Call (RPC) technologies a host may use for this communication. However, there are several problems specific to the host/add-in model that require special considerations that most RPC technologies do not consider. The most notable of these problems is threading model of the host and of the add-in.

MICROSOFT® .NET is an example of a set of technologies that provide a managed code environment. .NET managed code has access to all the services that the Common Language Runtime (CLR) technology makes available, such as cross-language integration, security and versioning support, and garbage collection. Code that does not operate within a runtime managed framework such as CLR is called unmanaged code.

In the .NET environment, the standard RPC technology is .NET Remoting. .NET Remoting provides an interprocess communication manager for managed code. .NET Remoting makes remote procedure calls transparent, i.e., invisible, to the caller/callee. That is, a first object may call a method on a second object which exists in a separate process without the first object knowing that the call is remote. .NET Remoting intercepts the call to the second object via a proxy and transports that call to the other process. However, in the current .NET Remoting implementation each call across process executes on a different thread in the target process. This can cause many problems for add-ins which normally run on a specific thread within the host application. If the add-in uses a technology which expects thread affinity, that technology will fail when the add-in is moved to an external process and called from multiple remoting threads. An example of such a technology is MICROSOFT WINDOWS® Timers.

A related problem occurs in the multitudes of unmanaged applications written using, for example, MICROSOFT'S® Common Object Model (COM) technology. COM technologies provide, among other things, an interprocess communication manager for unmanaged code. In COM applications, it is common practice for a thread within the application to be marked as a "Single-Threaded Apartment". Any call into objects within this apartment must first be marshaled onto the apartment's thread (i.e. transferred to execute on the thread contained within the apartment). COM keeps track of the incoming and out-going calls within the apartment. The collection of these calls is called the logical thread. When a new call enters the apartment, this call is called the "top-level call" of the logical thread. If a call leaves the apartment by calling an object outside the apartment boundaries (either cross-process or cross apartment) incoming top-level calls will be blocked by COM. If the out-going call results in a new call coming in, that call is part of the current logical thread and is allowed to enter the apartment. Only calls which are part of the current logical thread are allowed to re-enter the apartment. This means the current .NET Remoting technology is unacceptable for communication between a COM host and its add-ins. If the corn host was to make a call to an add-in using .NET Remoting, and that call executed on a different thread in the add-in, calls back to the host would appear to be a different top-level call to COM and would be rejected.

SUMMARY

In consideration of the above-identified shortcomings of the art, the present invention ensures thread affinity for interprocess communication in a managed code environment. It provides a remote procedure call channel for interprocess communication in a managed code environment which ensures thread-affinity on both sides of an interprocess communication. Using the channel, calls from a first process to a second process, such as from a host to an add-in, are guaranteed to run on a same thread in a target process. Furthermore, calls from the add-in to the host will also always execute on the same thread. An interprocess communication manager that supports thread affinity and reentrancy is able to correctly keep track of the logical thread of execution so calls are not blocked in unmanaged hosts. Furthermore, both unmanaged and managed hosts are able to make use of transparent remote call functionality provided by an interprocess communication manager for the managed code environment. Other advantages and features of the invention are described below.

BRIEF DESCRIPTION OF THE DRAWINGS

The systems and methods for ensuring thread affinity for interprocess communication in a managed code environment in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
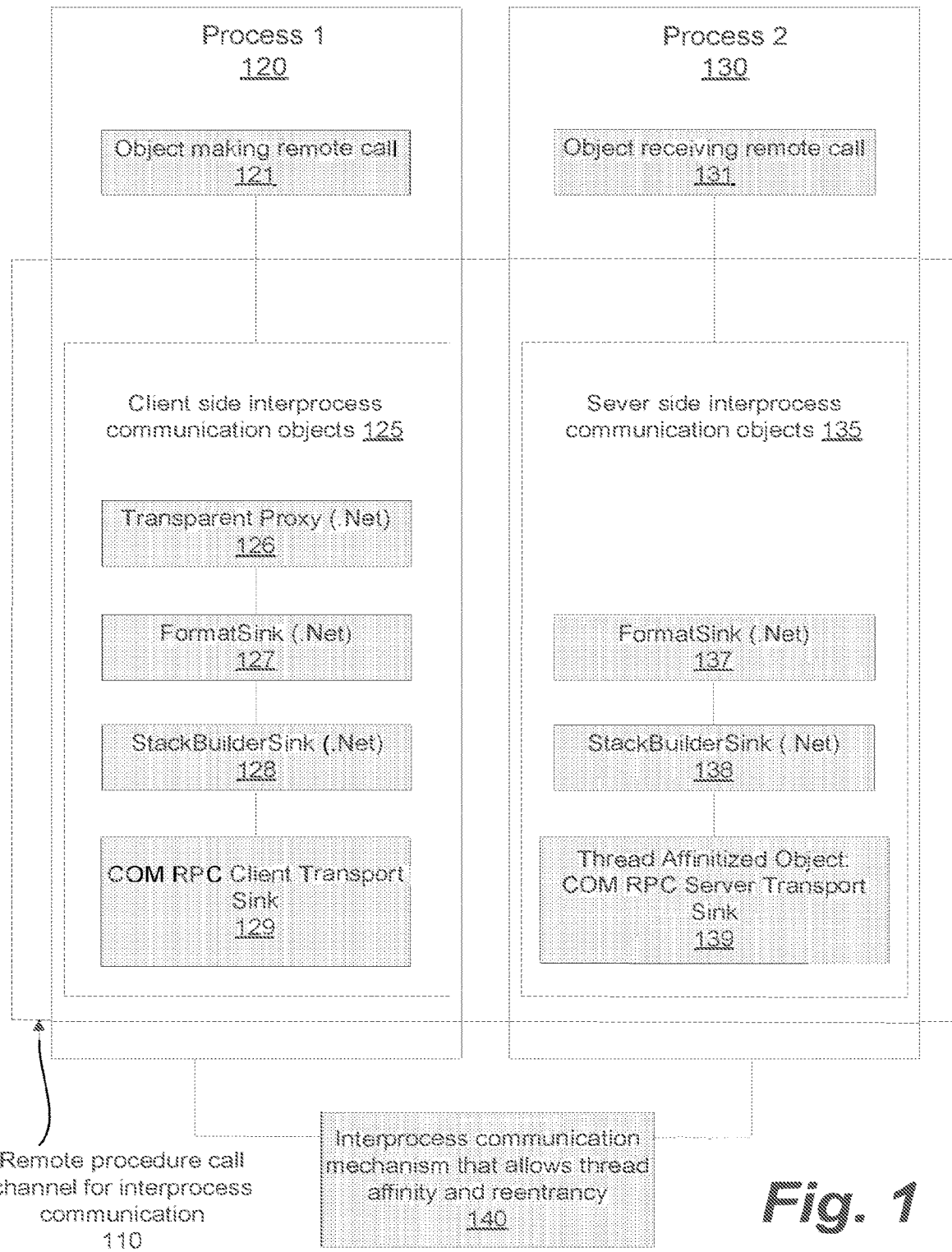
FIG. 1 provides a diagram of a remote procedure call channel for interprocess communication which uses an interprocess communication mechanism that allow thread affinity and reentrancy.

In one embodiment, interprocess communication in a managed code environment can be implemented using .NET Remoting technology. While the specific embodiment described herein is explained with reference to .NET Remoting, the invention is not limited to such embodiments. Referring to FIG. 1, .NET Remoting is architected around the concept of a channel 110. A channel comprises one or more sinks which each have a specific job. Each sink takes a cross-process message, processes it in some way, and hands it to the next sink. Thus, a message may travel from the object making a remote call 121 to the transparent proxy 126, then to a FormatSink 127, then to a StackBuilderSink 128. This continues until the transport sink 129 is reached. The transport sink 129 is responsible for actually sending the constructed message to the target process 130. The existing .NET Remoting sinks, e.g. 129 send this message using network protocols such as HTTP and TCP or using Microsoft Windows Named Pipes. However, the receiving end of these transport sinks use a different thread-pool thread for incoming messages, resulting in the problems described above. Thus, in one embodiment, custom sinks 129, 139 can plug into channel 110 at the incoming messages thread, and transport a message across process boundaries with thread affinity.

Thus, .NET Remoting provides a framework that allows objects to interact with one another across process boundaries. The framework may additionally provide a number of services, including activation and lifetime support. Formatters such as 127 and 137 are used for encoding and decoding the messages before they are transported by the channel. Applications can use binary encoding where performance is critical, or XML encoding where interoperability with other remoting frameworks is essential. XML encoding generally uses the SOAP protocol in transporting messages from one process 120 to the other 130. It will be understood that references herein to industry standard specifications such as XML and SOAP refer to any version of such specifications presently in use or later developed. Remoting was designed with security in mind, and a number of hooks are provided that allow channel sinks to gain access to the messages and serialized stream before the stream is transported over the channel.

Proxy objects such as 126 are created when a originating object 121 activates a remote object 131. The proxy object 126 acts as a representative of the remote object 131 and ensures that all calls made on the proxy 126 are forwarded to the correct remote object instance. When a originating object 121 activates a remote object 131, the framework creates a local instance of the class TransparentProxy that contains a list of all classes, as well as interface methods of the remote object. Since the TransparentProxy class is registered with the CLR when it gets created, all method calls on the proxy are intercepted by the runtime. Here the call is examined to determine if it is a valid method of the remote object and if an instance of the remote object resides in the same application domain as the proxy. If this is true, a simple method call is routed to the actual object. If the object is in a different application domain, the call parameters on the stack are packaged into an IMessage object and forwarded to a RealProxy class by calling its Invoke method. This class (or rather an internal implementation of it) is responsible for forwarding messages to the remote object. Both the TransparentProxy and RealProxy classes are created under the covers when a remote object is activated, but only the TransparentProxy is returned to the client.

Channels are used to transport messages to and from remote objects such as 131. When a originating object 121 calls a method on a remote object 131, the parameters, as well as other details related to the call, are transported through the channel 110 to the remote object 131. Any results from the call are returned back to the originating object 121 in the same way. An originating object 121 can select any of the channels registered on the "server" to communicate with the remote object 131, thereby allowing developers the freedom to select the channels that best suit their needs. It is also possible to customize any existing channel or build new ones that use different communication protocols. In one embodiment of the invention, a new .NET Remoting channel is built that operates using an interprocess communication mechanism that allows thread affinity and reentrancy 140, such as COM RPC.

In .NET Remoting, custom channels can be supported using channel services, which are pluggable using an interface called IChannel. The following provides sample code to load .NET channel services, for an exemplary new http or tcp channel, which can be extended by those of skill to a channel associated with any communications protocol:

Sample Code To Load .NET Channel Services:

```
public class myRemotingObj
{
    HttpChannel httpChannel;
    TcpChannel tcpChannel;
    public void myRemotingMethod( )
    {
    httpChannel = new HttpChannel( );
    tcpChannel = new TcpChannel( );
        ChannelServices.RegisterChannel(httpChannel);
    // Register the HTTP Channel
        ChannelServices.RegisterChannel(tcpChannel);
    // Register the TCP Channel
    }
}
```

All NET Remoting channels derive from IChannel and implement either IChannel Receiver or IChannelSender, depending on the purpose of the channel. Most channels implement both the receiver and sender interfaces to enable them to communicate in either direction. When a originations object 121 calls a method or a proxy 126, the call is intercepted by the remoting framework and changed into a message that is forwarded to the RealProxy class (or rather, an instance of a class that implements RealProxy). The RealProxy forwards the message to the channel sink chain for processing.

This first sink in the chain can be a formatter sink 127 that serializes the message into a stream of bytes. The message is then passed from one channel sink to the next until it reaches the transport sink 129 at the end of the chain. The transport sink 129 is responsible for establishing a connection with the transport sink 139 on the server side and sending a byte stream to the server. The transport sink 139 on the server then forwards the byte stream through the sink chain on the server side 135 until it reaches the formatter sink 137, at which point the message is deserialized from its point of dispatch to the remote object itself.

Managed code interprocess communication channels, such as .NET Remoting, can be employed in a variety of scenarios. For example, .NET Remoting objects can be exposed as a Web Service by hosting them in IIS. It is also possible to call Unmanaged Classic COM components through COM Interop Services. When the .NET Remoting client object creates an instance of a COM object, the object is exposed through a runtime callable wrapper (RCW) that acts as a proxy for the real unmanaged object. These wrappers appear to be just like any other managed class to the .NET client, but in actuality they just marshal calls between managed (.NET) and unmanaged (COM) code.

Similarly a .NET Remoting server object can be exposed to classic COM clients. When a COM client creates an instance of the .NET object, the object is exposed through a COM callable wrapper (CCW) that acts as a proxy for the real managed object.

Referring again to FIG. 1, in one embodiment, a remote procedure call channel 110 is provided comprising client side objects 125 and server side objects 135. The remote procedure call channel 110 may be a custom .NET Remoting channel. The channel 110 uses an interprocess communication mechanism that allows thread affinity and reentrancy 140. One such communication mechanism is COM RPC, an existing interprocess communication manager for unmanaged code.

In FIG. 1, messages flow from the object making a remote call, referred to herein as the originating object 121, down the stack through client side interprocess communication objects 125 to the transport sink 129. Transport sink 129 is a client side managed code interprocess communication object, as are objects 126, 127, and 128. Objects 137 and 138 are server side managed code interprocess communication objects.

A thread-affinitized COM object 139 receives a message from 129 via 140 and sends it up the stack, through server side interprocess communication objects 135 to the destination object 131. A call from an originating object 121 in Process 1 120 to a destination object 131 in Process 2 130 will always be received by thread affinitized object 139. "Thread affinitized" is used here as it is understood in the art, that is, a thread affinitized object cannot be communicated with via some other thread than that which the thread affinitized object itself uses for communications. A thread affinitized object is often also a single-threaded object.

Process 120 may be a host process and process 130 may be an add-in process. The .NET Remoting channel 110 in FIG. 1 ensures thread-affinity on both sides of the interprocess communication between host 120 and add-in 130. Calls from the host 120 to the add-in 130 are guaranteed to run on the same thread in the target process 130. Furthermore, calls in the other direction (from the add-in 130 to the host 120) will also always execute on the same thread if the add-in communicates back to the host on a channel that implements the invention. Thus, technologies such as WINDOWS® Timers work as expected regardless of whether an add-in is running in a separate process from its host. Interprocess communications mechanisms such as COM are able to correctly keep track of the logical thread of execution so calls are not blocked in unmanaged hosts, thereby supporting reentrancy. Furthermore, both unmanaged and managed hosts are able to make use of .NET Remoting's transparent remote call functionality.

In one embodiment, a piece of computer software, i.e. a computer program that implements a custom remote procedure call channel for interprocess communication 110 can plug into a managed code interprocess communication channel such as the .NET Remoting technology of 125,135 to guarantee thread-affinity on each side of a process boundary. Cross-process calls (the noun "call" and the noun "message" are used interchangeably herein) between managed code interprocess communication objects such as .NET objects 121 and 131 work transparently regardless of the threading model of the host 120 or add-in 130. Furthermore, add-ins 130 are able to work with the host's 120 .NET object model without directly relying on an external unmanaged cross-process communication technology such as COM RPC. COM RPC would require a substantially different programming model when the add-in 131 is running in process 120 than when the add-in 131 is running outside of process 120. Thus a combination of technologies can be used to attain the goals of cross-process object thread-affinity while remaining transparent to .NET technologies.

The custom .NET Remoting channel 110 uses a thread-affinitized COM object 139 for the actual transportation of messages between the two processes 120, 130. Existing .NET Remoting technology 129 converts a message to a destination object 131 into a collection of bits that describe the message. The collection of bits can be either SOAP (Simple Object Access Protocol) or .NET Remoting's binary format. Rather than transporting this message to process 130 using a network protocol such as HTTP or TCP (as .NET Remoting currently does), the message is passed across process boundaries to a thread affinitized COM object 139 in the other process 130. This COM object 139 gives the .NET Remoting message to the Remoting infrastructure 135 on the server side 130 which then dispatches the message to the appropriate object 131.

Since thread affinitized COM object 139 can only receive messages on one thread, the incoming cross-process message executes on the one and only thread in the apartment corresponding to the thread of object 139. This remoting channel 110 effectively gives thread affinity to the object 139 called across process. Furthermore, since the outgoing message appears to be a standard COM cross-process call, COM's logical thread system remains intact and unmanaged COM hosts (in one embodiment originating object 121 may be an unmanaged host object) are able to use .NET Remoting objects 125 instead of using COM RPC 140 directly.

Figure 2:
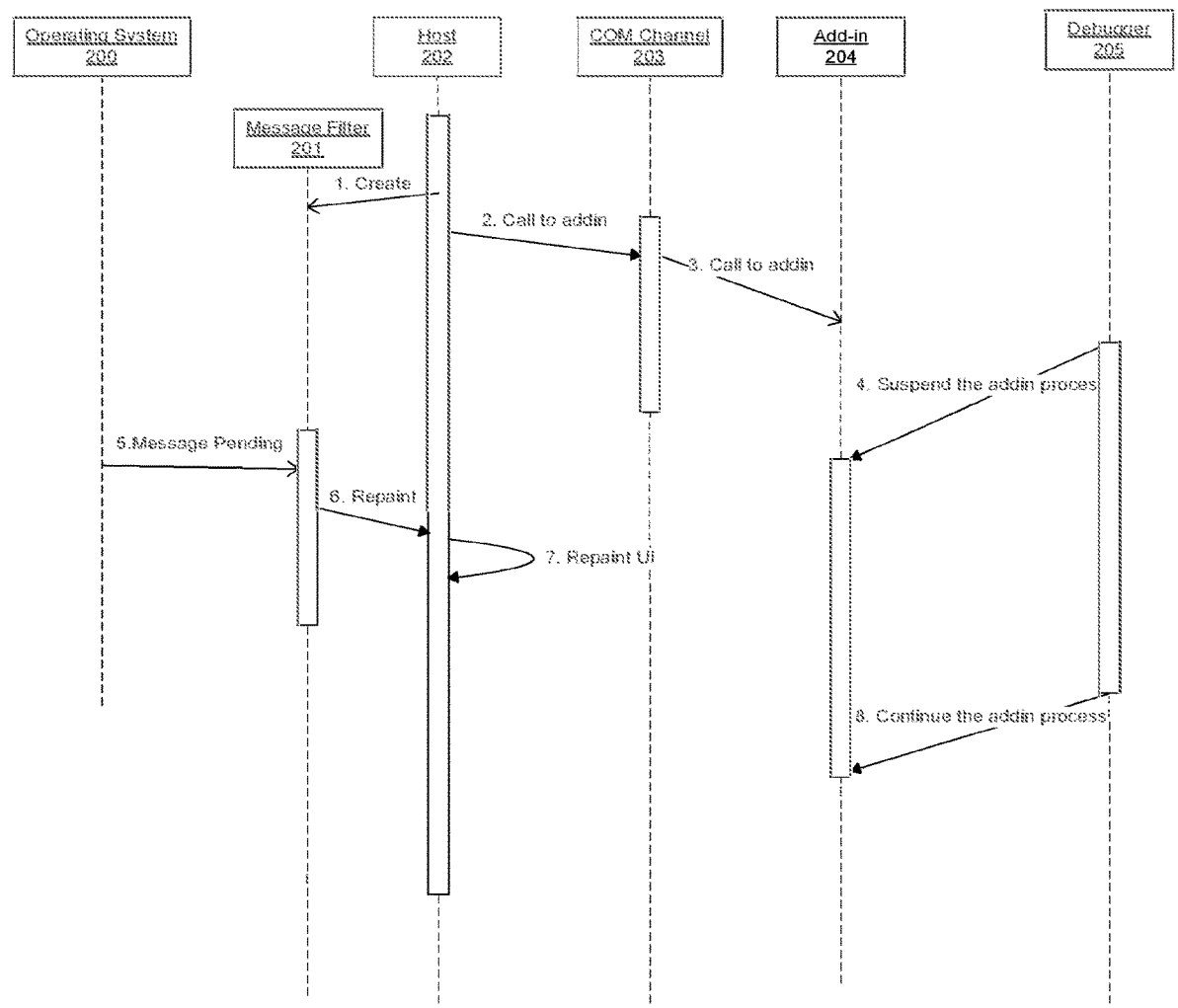
FIG. 2 illustrates an exemplary advantageous use of the invention in which a host 202 is painting while an add-in 204 is being debugged.

One advantage of the COM RPC channel over the existing channels is the ability for a host to install a message filter into a single threaded apartment to selectively control re-entrancy. Hosts using the COM RPC channel have the ability to pump windows messages while waiting for a call to return from the add-in. This allows the host to paint its user interface even while waiting for a call to the add-in to return. An example of this is illustrated in FIG. 2. This works even if the add-in process is being debugged and has been suspended by the debugger. The existing remoting channels do not have support for this scenario without exclusively using asynchronous calls. The state of the host process's user interface is very important to add-in developers because information about it may not be available in the debugger. A good example of such information in the user interface is the contents of cells in a MICROSOFT EXCEL® worksheet. Add-in developers have a much easier time debugging MICROSOFT EXCEL® add-ins if they are able to see the contents of the workbook while debugging.

In one embodiment, a message filter is a COM object which implements the IMessageFilter interface. COM RPC provides various notifications to the message filter, allowing the host to override some of the default behavior of COM. One such notification is MessagePending. MessagePending is sent when a call has exited the single threaded apartment and a windows message is waiting to be processed by the apartment's message loop. An add-in host using the COM RPC channel can register a message filter, and respond to MessagePending by pumping WM_PAINT, thus updating its user interface.

FIG. 2 demonstrates the host 202 painting while an add-in 204 is being debugged. 1) The host 202 creates the message filter 201. 2) The host 202 makes a call to the add-in 204 via the COM RPC remoting channel 203. 3) The call is transmitted to the add-in 204. 4) The debugger 205 suspends the execution of the add-in 204 process. 5) At some later time (while the debugger 205 still has the add-in 204 process suspended) the operating system 200 decides it is time for the host 202 to repaint its UI. Since there is a call outside the apartment, this message goes to the message filter 201 as MessagePending. 6) The message filter 201 tells the host 202 to repaint its UI. 7) The host 202 repaints. At some later time, the debugger 205 allows the add-in 204 process to continue execution.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A method comprising:
transmitting, from a first object to a second object, an interprocess message in a channel, wherein the first object is executing on a first process in a runtime managed environment and the second object is executing on a second process external to the first process, and wherein the channel is thread reentrant and enables thread affinity between the first process and the second process.

2. The method of claim 1, wherein the first object and the second object are hosted on a Web Service.

3. The method of claim 1, wherein the first object is exposed through a runtime callable wrapper ("RCW").

4. The method of claim 3, wherein the RCW acts as a proxy for the first object.

5. The method of claim 1, further comprising:
installing a message filter to selectively control reentrancy.

6. The method of claim 1, wherein the channel is implemented as a series of sinks.

7. The method of claim 1, wherein the channel is a remote procedure call channel for interprocess communication.

8. The method of claim 7, wherein the channel enables managed hosts and unmanaged hosts to use remote call functionality of the channel.

9. The method of claim 1, wherein the first process executes a thread used to:
transmit the interprocess message from the first object to the second object; and
transmit a response message from the second object to the first object.

10. The method of claim 1, wherein the first process is a host process and the second process is an add-in process.

11. The method of claim 1, wherein the channel comprises one or more interprocess communication objects for processing the interprocess message before the interprocess message is transmitted to the second object.

12. The method of claim 11, wherein processing the interprocess message comprises generating, in the first process, a proxy object for the second object, wherein calls to the proxy object are intercepted by a runtime environment associated with the channel.

13. The method of claim 1, wherein the channel enables the first process to transmit additional messages while awaiting a response to the interprocess message from the second object.

14. A system comprising:
at least one processor; and
a memory coupled to the at least one processor, the memory comprising computer executable instructions that, when executed by the at least one processor, causes the system to:
transmit, from a first object to a second object, an interprocess message in a channel, wherein the first object is executing on a first process in a runtime managed environment and the second object is executing on a second process external to the first process, and wherein the channel is thread reentrant and enables thread affinity between the first process and the second process.

15. The system of claim 14, wherein the first object and the second object are hosted on a Web Service.

16. The system of claim 14, wherein the first object is exposed through a runtime callable wrapper ("RCW").

17. The system of claim 16, wherein the RCW acts as a proxy for the first object.

18. The system of claim 14, the computer executable instructions when executed by the at least one processor further causing the system to:
install a message filter to selectively control reentrancy.

19. The system of claim 14, wherein the channel is implemented as a series of sinks.

20. A device comprising at least one processor, the processor executing computer readable instructions for performing a method, comprising:
transmitting, from a first object to a second object, an interprocess message in a channel, wherein the first object is executing on a first process in a runtime managed environment and the second object is executing on a second process external to the first process, and wherein the channel is thread reentrant and enables thread affinity between the first process and the second process.

* * * * *